(12) United States Patent
Yuen et al.

(10) Patent No.: US 10,679,587 B2
(45) Date of Patent: Jun. 9, 2020

(54) DISPLAY OF SUPPLEMENTAL INFORMATION

(71) Applicant: Hewlett-Packard Development Company, L.P., Houston, TX (US)

(72) Inventors: Hang Yan Yuen, Fort Collins, CO (US); Paul Howard Mazurkiewicz, Fort Collins, CO (US); Hui He, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,155

(22) PCT Filed: Jul. 22, 2016

(86) PCT No.: PCT/US2016/043589
§ 371 (c)(1),
(2) Date: Oct. 26, 2018

(87) PCT Pub. No.: WO2018/017125
PCT Pub. Date: Jan. 25, 2018

(65) Prior Publication Data
US 2019/0096367 A1 Mar. 28, 2019

(51) Int. Cl.
*G06T 19/00* (2011.01)
*G09G 5/14* (2006.01)
(Continued)

(52) U.S. Cl.
CPC .............. *G09G 5/14* (2013.01); *G06F 3/011* (2013.01); *G06F 3/0304* (2013.01);
(Continued)

(58) Field of Classification Search
CPC .... G09G 5/14; G09G 5/38; G09G 2340/0492; G06F 3/011; G06F 3/0346; G06F 3/0304; G06T 19/006
See application file for complete search history.

(56) References Cited

U.S. PATENT DOCUMENTS

| 8,576,276 B2 | 11/2013 | Bar-Zeev et al. |
| 2008/0266323 A1 | 10/2008 | Biocca et al. |

(Continued)

FOREIGN PATENT DOCUMENTS

| WO | WO-2015031167 A1 | 3/2015 |
| WO | WO-2015096145 A1 | 7/2015 |

OTHER PUBLICATIONS

Microsoft—Virtual Displays—Extend Your Desktop, Dec. 1, 2015, < https://microsoftstudios.com/ ~ 28 pages.
(Continued)

*Primary Examiner* — Robert J Craddock
(74) *Attorney, Agent, or Firm* — Trop Pruner & Hu

(57) ABSTRACT

In some examples, a computing device is to detect a fiducial mark on a portable device that comprises a display screen, generate supplemental information that corresponds to information presented in the display screen of the portable device, and cause display of the supplemental information by a display device of the computing device, according to an orientation that is based on the detected fiducial mark, the displayed supplemental information supplementing the information presented in the display screen of the portable device.

20 Claims, 5 Drawing Sheets

(51) Int. Cl.
*G06F 3/03* (2006.01)
*G06F 3/0346* (2013.01)
*G06F 3/01* (2006.01)
*G09G 5/38* (2006.01)

(52) U.S. Cl.
CPC .......... *G06F 3/0346* (2013.01); *G06T 19/006* (2013.01); *G09G 5/38* (2013.01); *G09G 2340/0492* (2013.01)

(56) References Cited

U.S. PATENT DOCUMENTS

| | | |
|---|---|---|
| 2011/0065496 A1 | 3/2011 | Gagner et al. |
| 2012/0120296 A1 | 5/2012 | Roberts et al. |
| 2013/0109961 A1 | 5/2013 | Bose et al. |
| 2013/0141421 A1 | 6/2013 | Mount et al. |
| 2013/0321390 A1 | 12/2013 | Latta et al. |
| 2013/0342569 A1 | 12/2013 | Karkkainen et al. |
| 2016/0225192 A1* | 8/2016 | Jones ............... G06F 3/012 |

OTHER PUBLICATIONS

Samsung Patent Turns People's Palms Into Virtual Keyboards, Mar. 7, 2014, < http://www.psfk.com/2014/03/samsung-palm-keyboard-patent.html > ~ 4 pages.

Serrano, M., et al., Desktop—gluey: Augmenting Desktop Environments with Wearable Devices, Aug. 24-27, 2015, < http://dl.acm.org/citation ~ 4 pages.

Jens Grubert et al: Multifi: Multi-Fidelity Interaction with Displays on and Around the Body. Human Factors in Computing Systems ACM 2 Penn Plaza, Suite 701 New York 10121-0701 USA Apr. 18, 2015 pp. 3933-3942 XP058068203.

* cited by examiner

DISPLAY OF SUPPLEMENTAL INFORMATION

BACKGROUND

Users can use various electronic devices to perform computing tasks. Some electronic devices are portable and can be carried by the users as the users move around.

BRIEF DESCRIPTION OF THE DRAWINGS

Some implementations of the present disclosure are described with respect to the following figures.

DETAILED DESCRIPTION

A "portable device" can refer to any electronic device that is moveable with a user as the user moves around between different locations. As examples, portable devices include notebook computers, tablet computers, smart phones, smart watches, game appliances, and so forth.

A portable device can include a display screen to display images. Some portable devices can have relatively small display screens, such as smart phones, smart watches, or small game appliances. The amount of information that can be presented in a small display screen of a portable device can be restricted. In some cases, a user may have to flip between different display windows in the display screen to view different information, which can be inconvenient.

In accordance with some implementations of the present disclosure, a computing device can be used to augment primary information presented in the display screen of a portable device. "Primary information" can refer to any information that is presented by the physical display screen of a portable device, where the primary information can include any or some combination of the following: text, an image, a video, and so forth. The computing device that can be used to augment the primary information presented in the portable device display screen can be a head-mounted device, or another type of computing device, such as a smart watch and so forth. The augmenting of the primary information displayed by the display screen of the portable device can be accomplished by generating a virtual display screen (or multiple virtual display screens) that contain(s) supplemental information for supplementing the primary information. "Supplemental information" can refer to any information that is associated with the primary information.

The supplemental information displayed in the virtual display screen(s) can be aligned with an orientation of the primary information displayed in the portable device display screen, as determined based on detection of a fiducial mark on the outer housing of the portable device.

A "virtual display screen" can refer to any displayed image as displayed by a display device of a computing device, where the displayed image is to display information that augments (or supplements) the primary information displayed in the portable device display screen. The virtual display screen can appear to extend the display screen of the portable device.

Figure 1B:
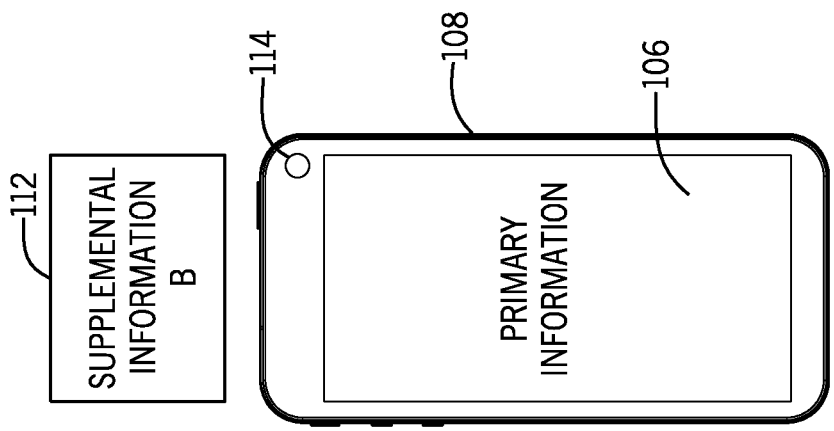
FIG. 1B illustrates virtual display screens to augment an actual display screen of a portable device, according to some examples.
Figure 1B:
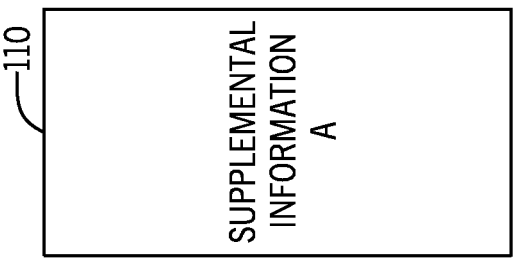
Figure 1A:
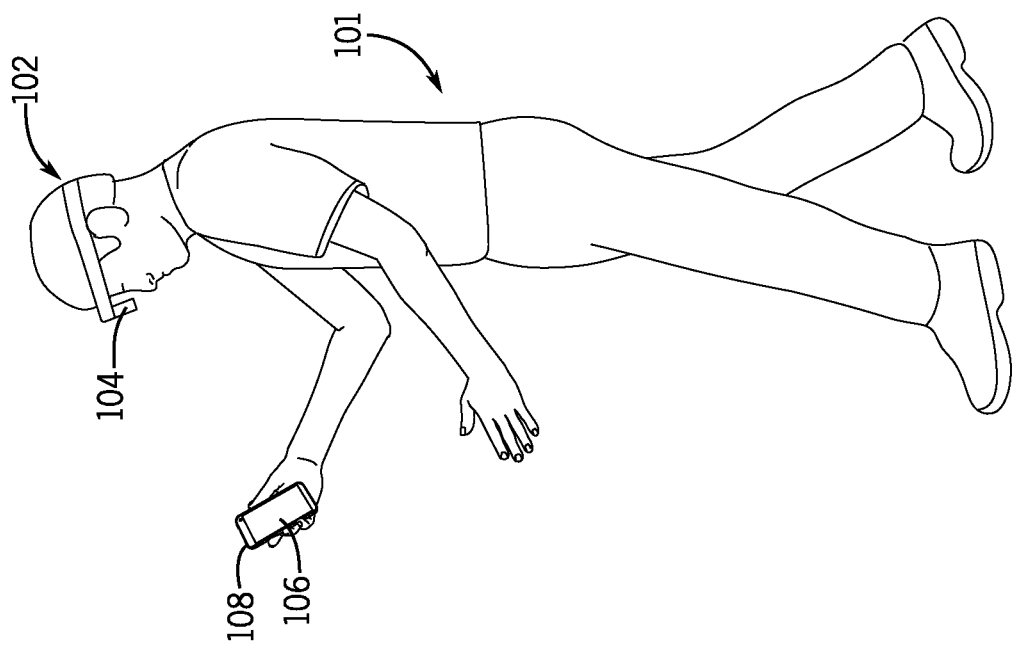
FIG. 1A is a schematic diagram of an arrangement that includes a portable device and a wearable device, according to some examples.

FIG. 1A shows an example arrangement that includes a head-mounted device 102 that can be worn on a head of a user 101. The head-mounted device 102 is an example of a computing device that can generate a virtual display screen or multiple virtual display screens. The head-mounted device 102 can be in the form of a visor, a helmet, or eyeglasses. In some examples, a head-mounted device 102 can include augmented reality goggles. The head-mounted device 102 includes a display device 104 that can be provided in front of the user's eye or eyes. The display device 104 of the head-mounted device 102 can be in the shape of a pair of eyeglasses or more generally can include an assembly that includes a display screen and a portion, which can include a transparent layer (e.g., a glass layer, a transparent plastic layer, etc.), through which the user 101 can see objects in front of the user. For example, the user 101 can see primary information displayed in a display screen 106 of a portable device 108 that is being carried by the user.

The head-mounted device 102 is an example of a body-mounted device. While the head-mounted device is mounted to the head of the user 101, a body-mounted device can more generally be mounted to a different part of the user 101, such as the user's arm, user's shoulder, user's chest, and so forth.

FIG. 1B shows the view of the user 101 of FIG. 1A, where the view includes primary information displayed in the display screen 106 of the portable device 108, and supplemental information in virtual display screens 110 and 112 displayed by the display device 104 of the head-mounted device 102.

The portable device display screen 106 is a physical object that is visible to the user 101 through the display device 104 of the head-mounted device 102. Thus, the portable device display screen 106 is a real world object. The virtual display screens 110 and 112 can be considered computer-generated augmented reality information that supplements the real world object.

The display screen 106 of the portable device 108 displays primary information, such as information of a web page that a user is browsing, a video clip, a document that the user is editing or reviewing, or any other type of information. In FIG. 1B, it is assumed that the display device 104 of the head-mounted device 102 is displaying two virtual display screens 110 and 112 that display respective supplemental information A and supplemental information B that augment the primary information. For example, if the primary information is a video clip, the supplemental information can include a title of the video clip, the actors in the video clip, date of creation of the video clip, and any other information. If the primary information includes a web page, such as a web page advertising a specific product, then the supplemental information can include reviews submitted by customers or professional reviewers, or any other information that is associated with the product and that is not available in the primary information that includes the web page for the product. If the primary information is a document that is being edited or reviewed by the user, the supplemental information can include information relating to who created the document, other users who may be collaborating in the editing of the document, and so forth.

Although FIG. 1B shows virtual display screens 110 and 112 adjacent a left side and top side, respectively, of the portable device display screen 106, it is noted that in other examples, the virtual display screens can be positioned adjacent different sides of the portable device display screen 106. Moreover, additional virtual display screens can be displayed by the display device 104 of the head-mounted device 102, for provision on respective sides of the portable device display screen 106 in addition to the virtual display screens 110 and 112. As further examples, just one virtual display screen can be displayed by the display device 104 of the head-mounted device 102.

FIG. 1B shows an example of a two-dimensional arrangement of the virtual display screens relative to the primary information. In other examples, a virtual display screen (or multiple virtual display screens) can be caused to be displayed in front of or behind the display screen of the portable device, to produce a three-dimensional view that combines the supplemental information and the primary information being displayed on the display screen 106 of the portable device 108.

The portable device display screen 106 can be rotated by the user to different orientations, such as a portrait orientation, or a landscape orientation, or any other orientation including a diagonal orientation. A virtual display screen displayed by the head-mounted device 102 is oriented according to the orientation of the portable device display screen 106. Thus, for example, if the portable device display screen 106 has a portrait orientation, then the primary information displayed by the portable device display screen 106 would also have a portrait orientation. The supplemental information (A and B) displayed in the virtual display screens 110 and 112 are aligned with the portrait orientation of the primary information.

To allow the head-mounted device 102 to determine the orientation of the portable device display screen 106, a sensor (or multiple sensors) on the head-mounted device 102 can detect a fiducial mark 114 provided on a surface of the outer housing of the portable device 108. A "fiducial mark" can refer to any mark, in the form of a text, a symbol, or any other indicator, that is provided on a known location on the outer housing of the portable device 108. The fiducial mark can be a logo of the portable device 108, or alternatively, the fiducial mark can be another type of mark that is formed on (e.g., printed on, deposited on, attached by adhesive or another type of fastener to, etc.) the outer surface of the housing of the portable device 108. The fiducial mark can be visible or invisible to a user. For example, the fiducial mark can be printed onto the housing of the portable device 108 using ultraviolet or infrared ink, which is invisible to a user. Alternatively, the fiducial mark can be the visible log of the portable device 108. As yet another example, the fiducial mark can include an element mounted to the housing of the portable device 108, such as a camera, a button, and so forth.

It is noted that detecting a fiducial mark can refer to either detecting one fiducial mark or detecting multiple fiducial marks formed on the surface of the outer housing of the portable device 108. Similarly, determining an orientation of the portable device display screen 106 based on a detected fiducial mark can refer to determining the orientation based on one detected fiducial mark or multiple detected fiducial marks.

Figure 2:
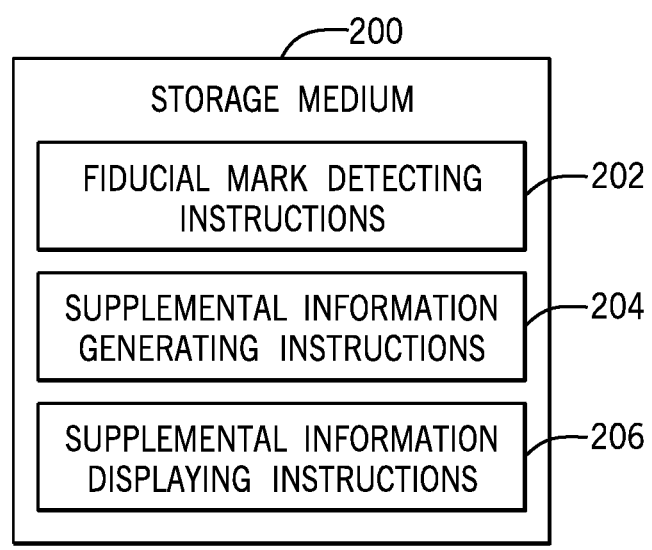
FIG. 2 is a block diagram of a storage medium storing machine-readable instructions according to some examples.

FIG. 2 is a block diagram of a non-transitory machine-readable or computer-readable storage medium 200 that stores machine-readable instructions that upon execution cause a computing device, such as the head-mounted device 102, to perform respective tasks. The machine-readable instructions are executable on a processor in the computing device. In the present disclosure, machine-readable instructions executable on a processor to perform computing tasks can include machine-readable instructions executable on one processor or executable on multiple processors to perform the computing tasks. Also, in the present disclosure, a processor to perform computing tasks can refer to one processor to perform the computing tasks, or multiple processors to perform the computing tasks.

The machine-readable instructions stored in the storage medium 200 include fiducial mark detecting instructions to detect a fiducial mark on a portable device (e.g., the fiducial mark 114 on the portable device 108). The machine-readable instructions further include supplemental information generating instructions 204 that generate supplemental information (e.g., supplemental information A and B) that corresponds to primary information presented in the display screen of the portable device.

The machine-readable instructions further include supplemental information display instructions 206 that cause display of the supplemental information by a display device of the computing device (e.g., the display device 104 of the head-mounted device 102), according to an orientation that is based on the detected fiducial mark. The orientation display of the supplemental information is aligned to correspond to the orientation of the portable device. For example, if the primary information in the portable device display screen 106 is in a portrait orientation, then the virtual display screens 110 and 112 are oriented to be aligned with the portrait orientation of the primary information. On the other hand, if the primary information is presented in a landscape orientation, then the virtual display screens 110 and 112 are oriented to be aligned with the primary information that is in the landscape orientation.

Figure 3:
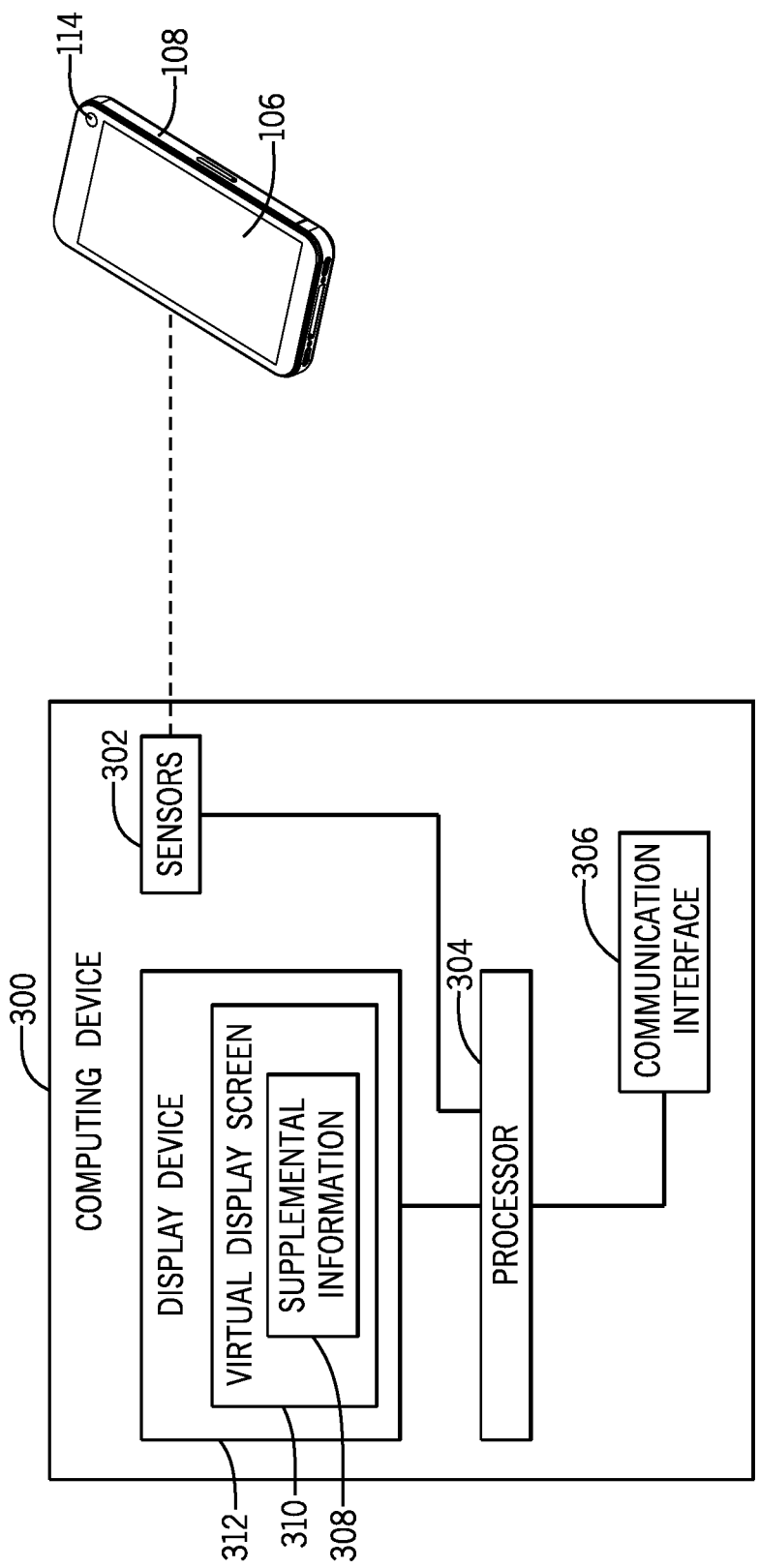
FIG. 3 is a block diagram of a computing device according to some examples.

FIG. 3 is a block diagram of an example computing device 300 according to further implementations, where the computing device 300 can be a head-mounted device, such as that shown in FIG. 1A, or another type of computing device that can be used to display supplemental information for augmenting primary information displayed in a portable device display screen.

The computing device 300 includes sensors 302 that can detect the fiducial mark 114 on the portable device 108. In some examples, the sensors 302 can include cameras that can capture respective images of the portable device 108 including the fiducial mark 114. The sensors 302 can provide measurement information (e.g., captured images) to a processor (or multiple processors) 304 of the computing device 300. A processor can include a microprocessor, a core of a multi-core microprocessor, a microcontroller, a programmable integrated circuit, a programmable gate array, or another hardware processing circuit.

Based on the measurement information from the sensors 302, the processor(s) 304 can determine an orientation of the portable device screen 106. For example, the processor(s) 304 can process captured images from the sensors 302 to identify the locations of the fiducial mark 114 (or multiple fiducial marks) in the captured images. The relative distance between the sensors 302 are known. In some examples, the processor(s) 304 can use a triangulation technique to determine the orientation of the portable device display screen 106 based on the position of the fiducial mark 114 identified in each captured image.

The computing device 300 further includes a communication interface 306 that can communicate over a link (either a wired link or a wireless link) with a remote device. In some examples, the processor(s) 304 can receive metadata associated with the primary information that is being displayed by the portable device display screen 106. The metadata can be received from the portable device 108, such as over a BLUETOOTH link, a WI-FI link, a Near-Field Communication (NFC) link, or any other link between the computing device 300 and the portable device 108. Alternatively, the communication interface 306 can receive the metadata from a different device, such as from a remote server that also provides the primary information for display by the portable display screen 106.

Based on the metadata regarding the primary information being presented in the portable device display screen 106, the processor(s) 304 can generate supplemental information 308 for display in a virtual display screen 310 (or multiple virtual display screens) displayed by a display device 312 of the computing device 300. The supplemental information 308 can be extracted from the received metadata, or alternatively, the processor(s) 304 can use the metadata to retrieve the supplemental information 308 from a remote source, such as the portable device 108, a remote server, and so forth. For example, the metadata that is received by the computing device 300 pertaining to the primary information being displayed by the portable device display screen 106 can include a uniform resource locator (URL) or other locator information, where the locator information can identify a location of the supplemental information 308. The processor(s) 304 can use the locator information to access a remote device to retrieve the supplemental information 308.

Figure 4:
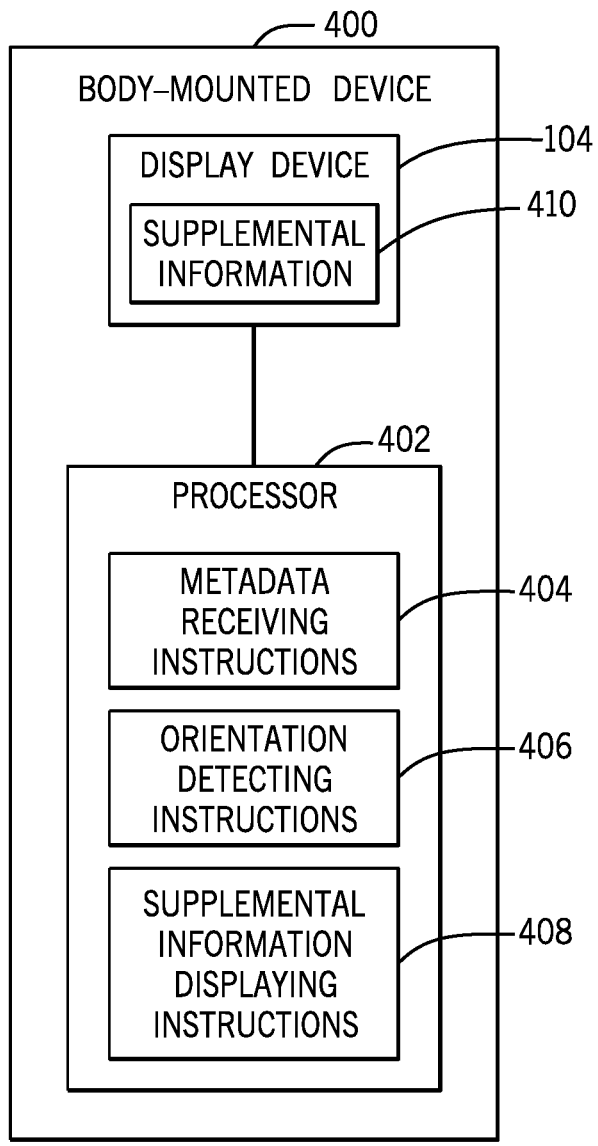
FIG. 4 is a block diagram of a body-mounted device according to some examples.

FIG. 4 is a block diagram of an example of a body-mounted device 400, according to further examples. An example of the body-mounted device 400 is the head-mounted device 102 discussed above. The body-mounted device 400 includes the display device 104, and a processor (or processors) 402 to execute machine-readable instructions to perform respective tasks. The machine-readable instructions that can be executed by the processor(s) 402 can include metadata receiving instructions 404 to receive metadata of primary information being displayed in a display screen of a portable device. The machine-readable instructions further include orientation detecting instructions 406 to detect an orientation of the display screen of the portable device based on a fiducial mark on a housing of the portable device. The machine-readable instructions further include supplemental information display instructions 408 that cause display, at the display device 104, of supplemental information 410 in a virtual display screen displayed by the display device 104, where the virtual display screen is positioned according to the orientation of the display screen of the portable device, and where the supplemental information 410 corresponds to the information being displayed on the display screen of the portable device.

Figure 5:
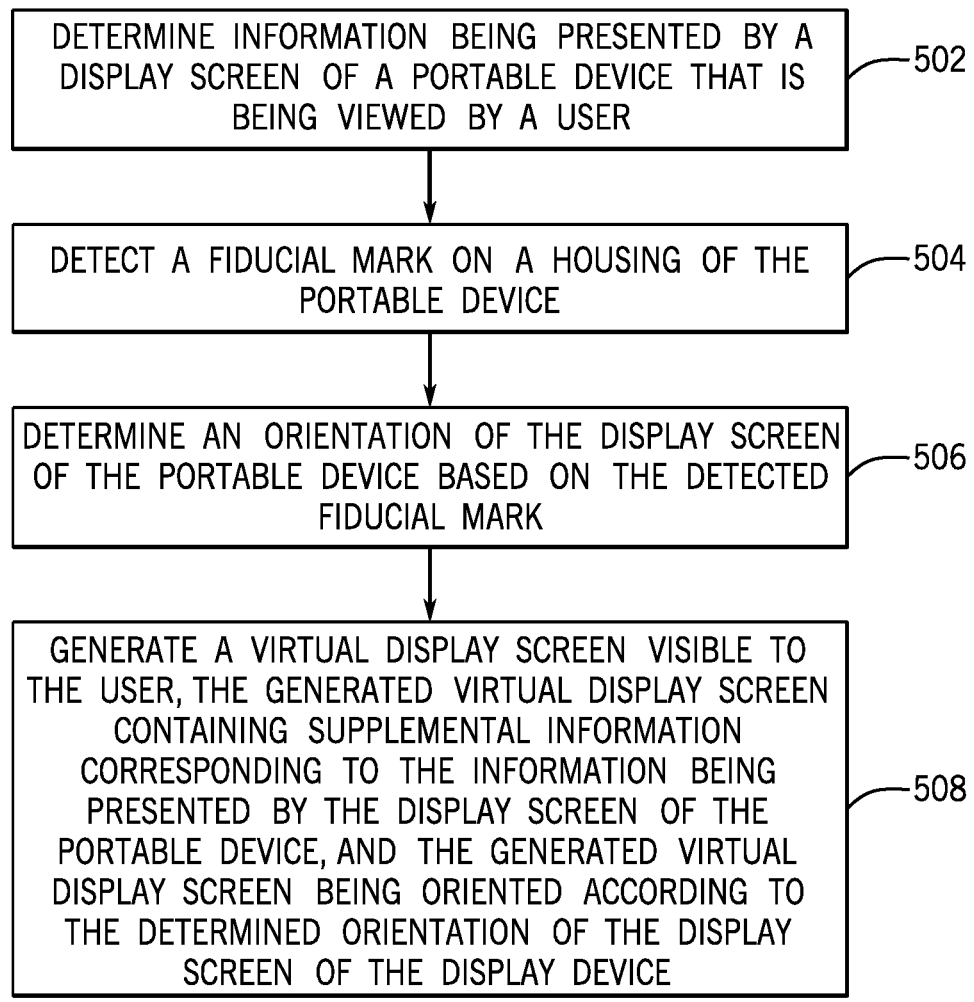
FIG. 5 is a flow diagram of a process according to some examples.

FIG. 5 is a flow diagram of a process that can be performed by a computing device, such as the computing device 300, or the head-mounted device 102, or the body-mounted device 400, according to some examples. The process includes determining (at 502) information being presented by a display screen of a portable device that is being viewed by a user. The process further includes detecting (at 504) a fiducial mark on a housing of the portable device. The process additionally includes determining (at 506) an orientation of the display screen of the portable device based on the detected fiducial mark. The process further includes generating (at 508) a virtual display screen that is visible to the user, the generated virtual display screen containing supplemental information corresponding to the information being presented by the display screen of the portable device, and the generated virtual display screen being oriented according to the determined orientation of the display screen of the portable device.

Machine-readable instructions as discussed above can be stored on a non-transitory machine-readable or computer-readable storage medium, such as the storage medium 200 of FIG. 2. A storage medium can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a computing device to:
   detect a fiducial mark on a portable device that comprises a display screen, the portable device separate from the computing device;
   generate supplemental information that corresponds to information presented in the display screen of the portable device; and
   cause display of the supplemental information in a display device of the computing device, according to an orientation that is based on the detected fiducial mark, the displayed supplemental information in the display device of the computing device supplementing the information presented in the display screen of the portable device, the display screen of the portable device being separate from the display device of the computing device.

2. The non-transitory machine-readable storage medium of claim 1, wherein the fiducial mark is formed on a housing of the portable device.

3. The non-transitory machine-readable storage medium of claim 1, wherein the instructions upon execution cause the computing device to further:
   determine an orientation of the display screen of the portable device based on the detected fiducial mark,
   wherein causing the display of the supplemental information comprises aligning the orientation of the display of the supplemental information to correspond to the orientation of the display screen of the portable device such that an orientation of the supplemental information in the display device of the computing device is aligned with an orientation of the information presented in the display screen of the portable device.

4. The non-transitory machine-readable storage medium of claim 3, wherein determining the orientation of the display screen of the portable device based on the detected fiducial mark comprises using measurement information of at least one sensor of the computing device to track the orientation of the display screen of the portable device.

5. The non-transitory machine-readable storage medium of claim 3, wherein the supplemental information is displayed in a plurality of virtual display screens adjacent respective plural sides of the display screen of the portable device, the plurality of virtual display screens being displayed in the display device of the computing device.

6. The non-transitory machine-readable storage medium of claim 3, wherein the instructions upon execution cause the computing device to further:
  detect, based on the fiducial mark, a change in orientation of the display screen of the portable device from a first orientation to a second orientation;
  in response to the change in orientation of the display screen of the portable device, change an orientation of the display of the supplemental information in the display device of the computing device.

7. The non-transitory machine-readable storage medium of claim 1, wherein the instructions upon execution cause the computing device to further:
  receive metadata regarding the information presented in the display screen of the portable device,
  wherein generating the supplemental information is based on the metadata.

8. The non-transitory machine-readable storage medium of claim 7, wherein the metadata is received by the computing device from the portable device over a communication link between the computing device and the portable device.

9. The non-transitory machine-readable storage medium of claim 7, wherein the metadata is received from a remote server.

10. The non-transitory machine-readable storage medium of claim 1, wherein generating the supplemental information comprises generating augmented reality information.

11. The non-transitory machine-readable storage medium of claim 1, wherein the displayed supplemental information in the display device of the computing device and the information presented in the display screen of the portable device are combined in a view presented to a user of the computing device.

12. The non-transitory machine-readable storage medium of claim 11, wherein the display device of the computing device comprises a transparent portion through which the information presented in the display screen of the portable device is visible to the user at a same time the supplemental information in the display device of the computing device is visible to the user in the view.

13. A body-mounted device comprising:
  a display device; and
  a processor to:
    receive metadata of information being displayed in a display screen of a portable device that is separate from the body-mounted device;
    detect an orientation of the display screen of the portable device based on a fiducial mark on a housing of the portable device;
    cause display, at the display device of the body-mounted device, of supplemental information in a virtual display screen that is positioned according to the orientation of the display screen of the portable device, the supplemental information based on the metadata of the information being displayed in the display screen of the portable device, the display device of the body-mounted device being separate from the display screen of the portable device.

14. The body-mounted device of claim 13, wherein the virtual display screen is caused to be displayed, in the display device of the body-mounted device, adjacent a side of the display screen of the portable device.

15. The body-mounted device of claim 13, wherein the virtual display screen is caused to be displayed in front of or behind the display screen of the portable device, to produce a three-dimensional view, visible to a user of the body-mounted device, that combines the supplemental information displayed at the display device of the body-mounted device and the information being displayed on the display screen of the portable device.

16. The body-mounted device of claim 15, wherein the display device of the body-mounted device comprises a transparent portion through which the information displayed in the display screen of the portable device is visible to the user at a same time the supplemental information displayed at the display device of the body-mounted device is visible to the user in the view.

17. The body-mounted device of claim 13, further comprising a sensor to detect the fiducial mark, the processor to determine the orientation of the display screen of the portable device based on measurement data from the sensor.

18. The body-mounted device of claim 13, wherein the processor is to:
  detect, based on the fiducial mark, a change in orientation of the display screen of the portable device from a first orientation to a second orientation;
  in response to the change in orientation of the display screen of the portable device, change an orientation of the virtual display screen containing the supplemental information in the display device of the body-mounted device.

19. A method comprising:
  determining, by a computing device, information being presented by a display screen of a portable device that is being viewed by a user, the portable device separate from the computing device;
  detecting, by the computing device, a fiducial mark on a housing of the portable device;
  determining, by the computing device, an orientation of the display screen of the portable device based on the detected fiducial mark; and
  displaying, at a display device of the computing device, a virtual display screen that is visible to the user, the virtual display screen displayed at the display device of the computing device including supplemental information corresponding to the information being presented by the display screen of the portable device, and the virtual display screen displayed at the display device of the computing device being oriented according to the determined orientation of the display screen of the portable device, wherein the display screen of the portable device is separate from the display device of the computing device.

20. The method of claim 19, further comprising:
generating, by the computing device, the supplemental information as augmented reality information to augment the information in the display screen of the portable device.

\* \* \* \* \*